United States Patent [19]

Wirth et al.

[11] Patent Number: 5,176,010
[45] Date of Patent: Jan. 5, 1993

[54] APPARATUS FOR MEASURING THE AMOUNT OF YARN WITHDRAWN FROM A WARP BEAM OF A WARP KNITTING MACHINE

[75] Inventors: Rudi Wirth, Schwarzenbach/Wald; Wolfgang Jahn, Naila, both of Fed. Rep. of Germany

[73] Assignee: LIBA Maschinenfabrik GmbH, Fed. Rep. of Germany

[21] Appl. No.: 700,503

[22] Filed: May 15, 1991

[30] Foreign Application Priority Data

May 16, 1990 [DE] Fed. Rep. of Germany ....... 4015769

[51] Int. Cl.⁵ .................................................. D04B 27/22
[52] U.S. Cl. .................................... 66/212; 139/107; 242/67.5
[58] Field of Search .............. 66/209, 210, 212, 213; 33/734, 735, 736, 737, 738, 739, 740, 741, 742, 743, 744, 745, 746, 747, 748, 749, 772, 773, 774, 775, 776, 777, 778, 779; 26/70; 139/105, 106, 107, 108, 109

[56] References Cited

U.S. PATENT DOCUMENTS

| | | | |
|---|---|---|---|
| 2,674,109 | 4/1954 | Bassist | 66/212 |
| 2,871,685 | 2/1959 | Bassist | 66/212 |
| 3,221,518 | 12/1965 | Bassist | 66/212 |
| 3,539,782 | 11/1970 | Upshur | 66/212 |
| 3,727,033 | 4/1970 | Bassist | 66/212 X |
| 3,781,532 | 12/1973 | Dorsman et al. | 66/212 X |
| 3,930,523 | 1/1976 | Garcia | 66/212 X |

Primary Examiner—Werner H. Schroeder
Assistant Examiner—Larry D. Worrell, Jr.
Attorney, Agent, or Firm—Bell, Seltzer, Park & Gibson

[57] ABSTRACT

An apparatus for measuring the amount of yarn withdrawn from a warp beam mounted on the frame of the warp beam knitting machine is disclosed. A support arm is mounted on the frame and a lever arm is pivotally mounted on the support arm. A pressure roll is supported on the lever arm and engages the yarn wound on the warp beam. The pressure roll is operatively connected to a signal generator which generates pulses representative of the length of yarn withdrawn from the warp beam. A limit switch is mounted on the support arm and is adapted for electrical connection to the main drive mechanism of the warp knitting machine. The limit switch has open and closed positions adapted for controlling operation of the knitting machine. When the switch is closed the knitting machine is operable. The support arm is pivotally movable into 1) a biased, operative position pivoted toward the warp beam in which the pressure roll is engaged with the warp beam and the limit switch is closed; 2) an intermediate position in which the support arm is pivoted away from the warp beam, the limit switch is open, and the pressure roll engages the warp beam; and 3) an inoperative position in which the support and lever arms are pivoted rearwardly from the warp beam and the limit switch is open.

7 Claims, 3 Drawing Sheets

APPARATUS FOR MEASURING THE AMOUNT OF YARN WITHDRAWN FROM A WARP BEAM OF A WARP KNITTING MACHINE

FIELD OF THE INVENTION

The present invention relates to an apparatus for measuring the amount of yarn withdrawn from the warp beam of a warp knitting machine.

BACKGROUND OF THE INVENTION

In one known apparatus for measuring the amount of yarn withdrawn from the warp beam of a warp knitting machine, a pressure roll engages the warp beam and drives directly a tachogenerator which emits pulse signals representing the amount, that is, the length of yarns withdrawn from the warp beam. The pulse signals may then be used in a known, conventional manner for controlling the drive mechanism of the warp beam.

In this one known apparatus, the pressure roll is mounted on a support arm which is biased toward the warp beam so that the pressure roll engages the warp beam. When the warp beam is changed, the support arm pivots away from the warp beam and the pressure roll disengages from the warp beam and stops rotating. When the support arm is pivoted in this manner during normal operation of a warp knitting machine, the drive mechanism of the warp beam is abruptly interrupted as soon as pivotal support arm motion begins because the stoppage of the pressure roll rotation simulates an absence of yarn feed. As a consequence of the abrupt termination of pressure roll rotation, the warp beam drive accelerates, leading to a sagging of the yarns and an immediate breakdown in the warp knitting machine operation. Additionally, sometimes during knitting, the support arm may be moved slightly from operator error or machine vibration, thus creating the same problem.

SUMMARY OF THE INVENTION

It is therefore an object of the present invention to provide an apparatus for measuring the amount of yarn withdrawn from the warp beam of a warp knitting machine and which overcomes the disadvantages of the prior art.

It is another object of the present invention to provide an apparatus for measuring the amount of yarn withdrawn from the warp beam of a warp knitting machine having a pressure roll engaging the warp beam, a signal generator operatively connected to the pressure roll for generating signals representative of the yarn output from the warp beam, and a support arm which carries and pivots the pressure roll into engagement with the warp beam, and which allows continued signal generation when the support arm is initially moved rearward away from the warp beam.

In accordance with the present invention, the apparatus for measuring the amount of yarn withdrawn from a warp beam of a warp knitting machine allows for continued signal generation when the support arm is initially moved slightly away from the warp beam such as when a warp beam is to be changed. A support arm is pivotally mounted on the frame supporting the warp beam. A lever arm is pivotally mounted on the support arm and extends toward the warp beam. A pressure roll is rotatably supported on the lever arm for engaging the yarn wound on the warp beam and rotating with the warp beam as the yarn is withdrawn. A signal generator, preferably a pulse generator, is mounted on the lever arm and operatively connected to the pressure roll so that as the pressure roll rotates, pulses are generated representative of the amount, that is, the length of yarn withdrawn from the warp beam.

A two position limit switch is mounted on the support arm and adapted for electrical connection to main drive mechanism of the warp knitting machine. The limit switch has open and closed positions which are adapted for controlling operation of the knitting machine so that when the switch is closed the knitting machine is operative and when the switch is open the knitting machine is inoperative.

The support arm is pivotally movable into
1) a biased, operative position pivoted toward the warp beam in which the pressure roll is engaged with the warp beam and the limit switch is closed;
2) an intermediate position pivoted away from the warp beam and in which the pressure roll is engaged with the warp beam and the limit switch is open; and
3) an inoperative position in which the support and lever arms are pivoted rearwardly from the warp beam so that the pressure roll is disengaged from the warp beam and the limit switch is open.

Upon movement of the support arm from the inoperative to the operative positions, the pressure roll engages the warp beam before closing the limit switch, and upon movement from the operative to the inoperative position the pressure roll continues to engage the warp beam after opening of the limit switch.

In the preferred embodiment a spring is mounted to the support arm for biasing said support arm in a direction toward the warp beam. A second spring engages the support arm and the lever arm for biasing the lever arm forwardly away from the support arm. As the support arm is pivoted rearwardly into the intermediate position, the lever arm is biased forwardly toward the warp beam so that the pressure roll continues to engage the warp beam as the support arm is moved into the intermediate position. The spring mounted on the frame exerts a greater biasing force than the spring engaging the lever and support arms. Thus, when the support arm is biased forwardly into the operative position the pressure roll engages the warp beam and the lever arm is pushed rearwardly toward the support arm.

The support arm also includes a stop member extending toward the lever arm. The limit switch mounts adjacent the stop member and the lever arm engages the limit switch when the support arm is in an operative position. The support arm advantageously is substantially U-shaped and includes a base portion on which the lever arm is pivotally mounted. A support arm front member extends upwardly from the base portion and the stop member is positioned on the front member for limiting forward movement of the lever arm. The stop member is adjustable.

DETAILED DESCRIPTION OF THE PREFERRED EMBODIMENT

Figure 1:
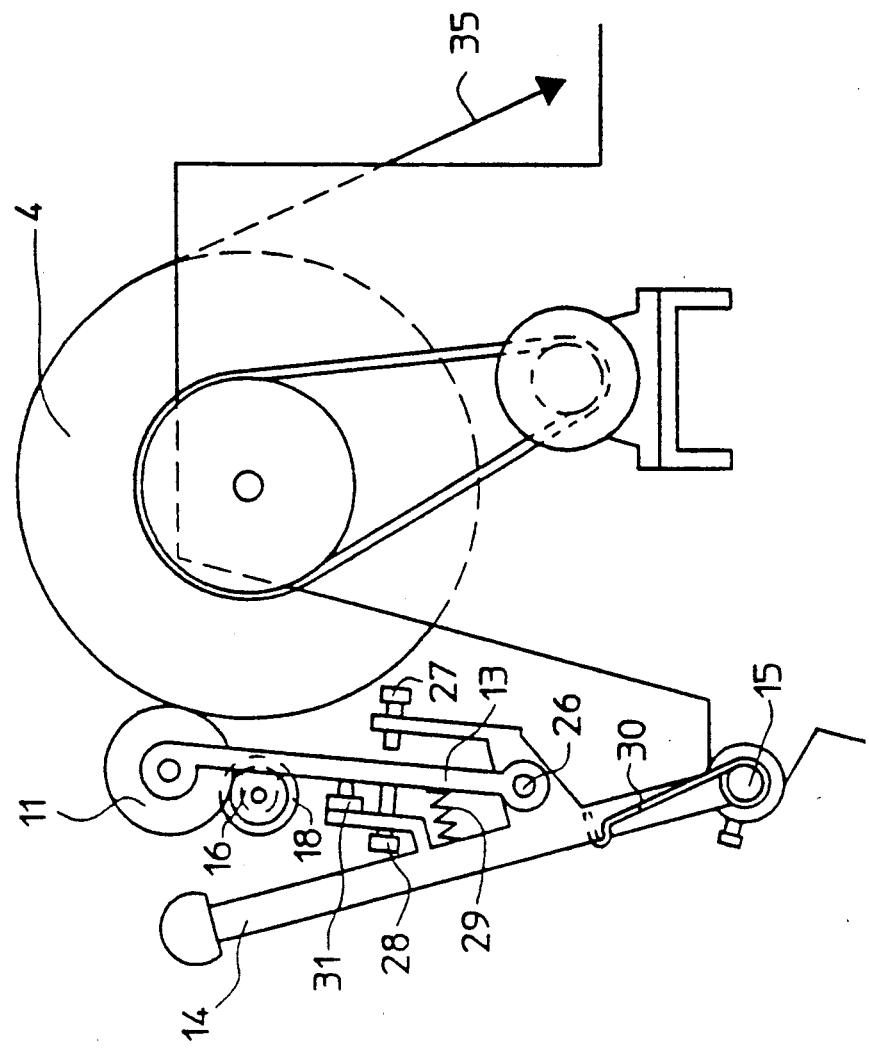
FIG. 1 is a side elevational view of the frame, warp beam, and the support arm and pressure roll in its operative position.
Figure 2:
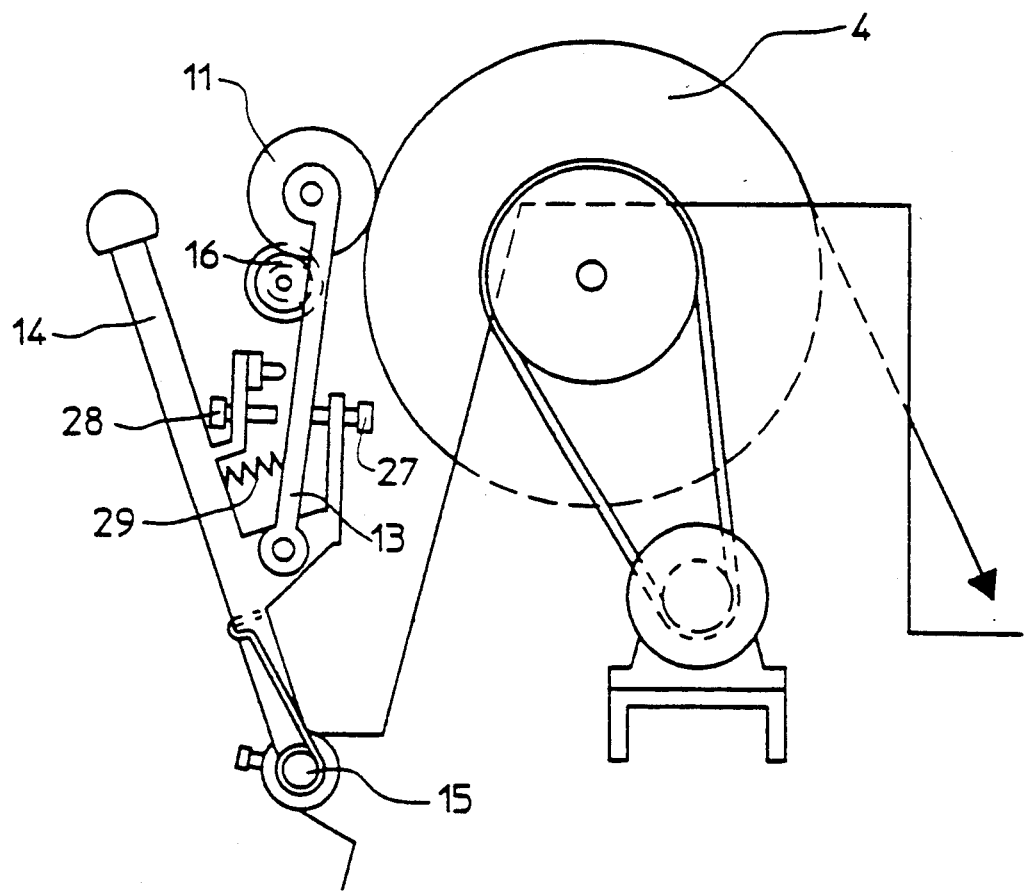
FIG. 2 is a view similar to FIG. 1 and showing the support arm in an intermediate position and the pressure roll still engaging the warp beam.
Figure 3:
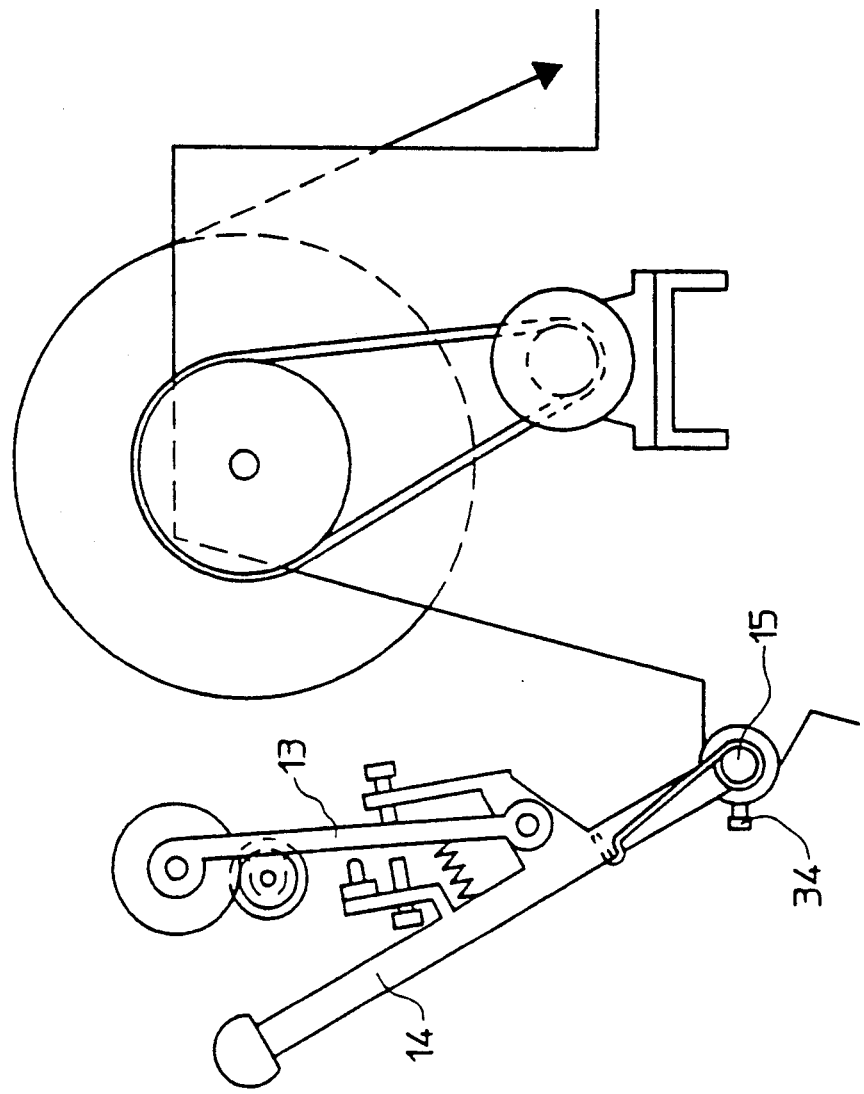
FIG. 3 is a view similar to FIG. 1 and showing the support arm in an inoperative position and the pressure roll disengaged from the warp beam.

There is illustrated in FIGS. 1-3 a portion of a warp knitting machine which shows a warp beam 4 and a support arm 14 with the structural members attached thereto. The remaining components of the warp knitting machine are not illustrated because they are not essential for describing the present invention.

FIG. 1 shows the apparatus of the present invention in which the support arm 14 is in an operative position. In this operative position a pressure roll 11 is engaged with the peripheral yarn surface of the warp beam 4. As the warp beam rotates, it drives the pressure roll 11. The pressure roll 11 transmits the warp beam rotation to a drive roll 16 engaging the pressure roll. The drive roll 16 is directly coupled to a signal generator 18 which emits signals representative of the amount of yarn delivered from the warp beam.

The pressure roll 11 and drive roll 16 are rotatably mounted on a lever arm 13. The lever arm 13 is pivotally mounted on the support arm 14 by means of a shaft 26. The lever arm 13 can be pivoted forward and backward between adjustable stops 27 and 28. A spring 29 interconnects the lever and support arms 13 and 14 biases the lever arm 13 in a direction toward the warp beam 4. The support arm 14 is supported for pivotal movement on a shaft 15. A spring 30 interconnects the frame and the support arm and biases the support arm in a direction toward the warp beam 4. The force of the spring 30 is greater than the force of the spring 29 interconnecting the lever and support arms 13 and 14 so that when the support arm 14 is biased forward into the operative position, the lever arm 14 is pushed rearwardly to engage the stop 28 of the support arm 14 (FIG. 1). In the illustrated operative position of FIG. 1, the pressure roll 11 engages the warp beam 4, and the lever arm 13 engages the stop 28 thereby limiting pivotal movement of the support arm 14 in a direction toward the warp beam 4.

Figure 1A:
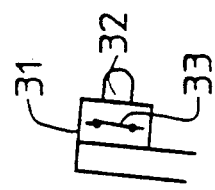
FIG. 1a is a view of the closed limit switch.

A limit switch 31 is secured to the support arm 14 adjacent the stop 2s. The limit switch 31 is adapted to be electrically connected to the main operating drive mechanism of the warp knitting machine. The limit switch has contacts 33 which when closed, maintain operation of the knitting machine, and when open, stop operation of the knitting machine. The limit switch 31 includes a plunger 32 (see enlarged illustration of FIG. 1a) which is pushed inward by the lever arm 13, thereby closing the contacts 33. When the contacts 33 initially close, the warp knitting machine starts.

Figure 3A:
FIG. 3a is a view of the open limit switch.

During knitting operation, the support arm may accidentally be moved slightly away from the warp beam 4. Additionally, if the warp beam is to be changed, the support arm 14 is initially moved rearward as shown in FIG. 2. In this intermediate position, the spring 29 causes the lever 13 to pivot away from the support arm 14. The pressure roll 11, however, remains engaged with the warp beam 4. As the support arm is pivoted more, as shown in FIG. 3, the pivotal movement of the lever 13 is finally limited by the stop 27. Until this off or inoperative position is reached, the pressure roll 11 remains engaged with the warp beam 4 so that the generation of yarn length signals effected by the drive roll 16 is maintained. As the lever arm 13 pivots away from the stop 28, however, the plunger 32 of the limit switch 31 is released to open the contacts 33 (see enlarged detail view of FIG. 3a). When the contacts 33 open, the warp knitting machine is stopped, but, as shown in FIG. 2, the pressure roll 11 remains engaged with the warp beam 4 and the generation of signals is maintained before machine operation is stopped. When the support arm 14 is further pivoted to the inoperative position shown in FIG. 3, the pressure roll 11 disengages from the warp beam 4 and the signal generator 18 no longer delivers yarn length pulses.

A conventional drop-in pin 34 is positioned on the bearing of the shaft 15 for keeping in known manner the support arm 14 in the inoperative position shown in FIG. 3. If several warp beams or yarn laying bars are used on the warp knitting machine, a plurality of the above-described apparatus shown in FIGS. 1-3 are provided to individually control the withdrawal of yarns 35 from each warp beam.

Because the pressure roll 11 is used as an intermediate roll between the drive roll 16 and warp beam, the drive roll 16 can be manufactured with a hard, wear-resistant surface and at a predetermined, desired diameter so that wear on the pressure roll will not affect the delivery of the yarn length signals generated by the signal generator. It should be understood that the above-described apparatus having the limit switches 31 actuatable by the lever arm 13 also can be used when only the pressure roll is supported on the support arm 14 and drives directly a signal generator.

The present invention offers several benefits over the prior art apparatus as described above. Because the pressure roll remains engaged with the warp beam after the support arm is initially moved rearward (FIG. 2), the generation of the yarn length pulses is maintained. Thus, when the support arm initially is moved rearward, such as when the warp beam is to be changed, the drive mechanism of the warp beam is not interrupted. An absence of yarn feed is not detected as in the prior art apparatus and the warp beam will not accelerate causing the warp beam yarns to sag and the machine to break down.

While a specific embodiment of the invention has been specifically shown and described, it will be understood that this was for purposes of example only, and not for purposes of limitation, the scope of the invention being in accordance with the following claims.

That which is claimed is:

1. An apparatus for measuring the amount of yarn withdrawn from a warp beam of a warp knitting machine having a frame supporting the warp beam, and comprising a support arm pivotally mounted on the frame, a lever arm pivotally mounted on the support arm and extending toward the warp beam, a pressure roller rotatably supported on the lever arm for engaging peripheral yarns wound on the warp beam and rotating with the warp beam as the yarn is withdrawn, a signal generator operatively connected to the pressure roll so that as the pressure roll rotates, pulses are generated representative of the length of yarn withdrawn from the warp beam, a limit switch mounted on the support arm and adapted for electrical connection to a main drive mechanism of the warp knitting machine, said limit switch having a first position and a second position and adapted for controlling operation of knitting machine so that when the switch is in the second position the knitting machine is operative and when the switch is in the first position the knitting machine is inoperative, and wherein said support arm is pivotally movable into a) a biased, operative position pivoted toward a warp beam in which the pressure roll is engaged with the warp beam and the limit switch is in the second position;

b) an intermediate position in which the support arm is pivoted away from the warp beam, the limit switch is in the first position, and the pressure roll is engaged with the warp beam; and c) an inoperative position in which the support and lever arms are pivoted rearwardly from the warp beam and the pressure roll is disengaged from the warp beam and the limit switch is in the first position;

wherein upon movement of the support arm from the inoperative position to the operative position the pressure roll engages the warp beam before the limit switch is switched to the second position, and wherein upon movement of the support arm from the operative position to the inoperative position the pressure roll continues to engage the warp beam after the limit switch is switched to the first position.

2. The apparatus according to claim 1 including spring means engaging said support arm and said lever arm for biasing said lever arm forwardly away from said support arm so that as said support arm is pivoted rearwardly into the intermediate position the lever arm is biased forwardly toward the warp beam so that the pressure roll continues to engage the warp beam.

3. The apparatus according to claim 2 including spring means mounted on the frame and interconnecting said support arm for biasing said support arm in a direction toward the warp beam.

4. The apparatus according to claim 3 wherein said spring means mounted on said frame exerts a greater biasing force than said spring means engaging said support arm and said lever arm.

5. The apparatus according to claim 4 wherein said support arm includes a stop member, and said limit switch is mounted on said stop member wherein said lever arm engages the limit switch when the support arm is in an operative position.

6. The apparatus according to claim 1 wherein said support arm is substantially U-shaped and includes a base portion on which the lever arm is pivotally mounted, and including a front member extending upwardly from the base portion, and a stop member positioned on the front member for limiting forward movement of the lever arm.

7. The apparatus according to claim 6 wherein said stop member positioned on the front member of the support arm is adjustable.

* * * * *